Patented Nov. 28, 1939

2,181,669

UNITED STATES PATENT OFFICE 2,181,669

PROCESS FOR THE EXTRACTION OF BAUXITE AND OTHER ALUMINUM CONTAINING SUBSTANCES

Rudolf Scholder, Karlsruhe, Germany

No Drawing. Application May 10, 1937, Serial No. 141,862. In Germany May 11, 1936

1 Claim. (Cl. 23—143)

As is well known the costs of the caustic alkali and of the evaporating steps in the known alkaline methods for the manufacture of alumina are the factors which determine the economy of the production of aluminum. It is therefore essential that these costs should be reduced as much as possible. This can be done by controlling the process during the action of the alkaline liquor on the bauxite or other aluminiferous materials in such manner that the percentage of alumina in the produced aluminate solution is as high as possible or by replacing the caustic alkali metal by cheaper substances.

The increase of the concentration of aluminum oxide in the aluminate solution is however limited by the fact that insufficient addition of caustic alkali metal causes the production of an excess of alkali metal aluminate which is not stable and again reacts to form aluminum hydroxide and sodium hydroxide, causing considerable losses in the production of aluminum oxide. In order to obtain stable aluminate compounds the amount of alkali in the prior art processes is not allowed to fall below a certain limit and in practice this limit is such as to maintain a proportion of about 1.8 molecules $Na_2O$ to 1 molecule $Al_2O_3$ in the extraction liquor passing from the aluminiferous material.

The other way of reducing the costs, i. e., the replacement of caustic alkali metal by cheaper substances has already been adopted in so far as lime has been added to the liquor before carrying out the extraction, whereby the silica from the aluminiferous materials at least partially combined with lime to form an insoluble calcium silicate instead of being combined with alkali metal and aluminum oxide.

Now it has been found according to this invention that in the extraction liquor a portion of the caustic alkali metal may be replaced by alkali metal halides such as sodium chloride or sodium bromide or the corresponding potassium salts. It has been further discovered that when an extraction liquor containing these halides is used a low molecular proportion of even 1.1 $Na_2O$ to 1 $Al_2O_3$ may be maintained because mixed complex alkali-metal hydrate-alkali metal halide-aluminates are formed having the formula $[Al(OH)_4Cl]Na_2$ which are stable in the liquor.

From the above it will be seen that in carrying out the process according to the invention, not only may the caustic alkali metal be replaced by cheaper substances but a substantial increase in the concentration of the dissolved aluminum oxide is obtained. By increasing thereby the efficiency of the plant a reduction of the manufacturing costs of aluminum oxide is obtained accordingly.

Furthermore it has been found that by stirring aluminiferous materials in such diluted liquors containing alkali metal halides and particularly NaCl, NaBr, KCl, or KBr a greater efficiency in the precipitation of aluminum oxide is obtained as compared with the stirring of the aluminate solutions in the Bayer process.

Finally it has been found that the separation of the iron-oxide or the so-called "red mud" from the extraction liquor may according to the new process be carried out without any difficulty.

The process according to the invention is otherwise carried out in exactly the same manner as is the case with the known alkaline methods.

The process is not limited to the wet bauxite extraction only but may be used in all cases in which aluminate liquors for the production of pure aluminum oxide are treated with or without pressure. For instance the advantages of the invention are also apparent in the treatment of aluminum containing compounds and substances which are produced by the dry or "pyrogenic" process.

*Example 1*

575 kg. gently calcined and finely ground bauxite containing 60% of $Al_2O_3$ are stirred with 1 cubic meter of an extraction liquor containing 374 grams NaOH (corresponding to 290 g. $Na_2O$) and 93 grams NaCl per cubic decimeter. 1 molecule NaOH thereby corresponds to 0.17 molecule NaCl. The mixture is heated to a temperature of 180° centigrade for several hours in a stirring autoclave. After extraction, the undiluted extraction liquor contains 290 grams $Na_2O$, 93 grams NaCl and 318 grams $Al_2O_3$ per cubic decimeter. The molecular ratio of $Al_2O_3$ to $Na_2O$ in the extraction liquor is therefore 1 to 1.50. After suitable cooling the contents of the autoclave (aluminate liquor and red mud) are all at once or step by step diluted with 1.9 cubic meters of water and the aluminate liquor is separated by filtration from the red mud. This filtration is carried out either after partial dilution or after total dilution with water. The liquor which now has a total volume of about 2.9 cubic meters is suitably diluted for stirring and contains 100 grams $Na_2O$, 110 grams $Al_2O_3$ and 32 grams NaCl per cubic decimeter. After inoculation with crystallized aluminum hydroxide stirring at a temperature of about 40° C. is carried out for 2½ to 3 days. The precipitated aluminum hydroxide is filtered, washed and calcined to $Al_2O_3$ at a temperature above 1000° C. The stirred and filtered liquor remaining after such filtration still contains 39 grams $Al_2O_3$, 100 grams $Na_2O$ and 32 grams NaCl per cubic decimeter. The liquor is then stirred to obtain a molecular ratio of $Al_2O_3$ to $Na_2O$ equal 1 to 4.20. Therefore 205 kilograms $Al_2O_3$ are obtained from 1 cubic meter of undiluted extraction liquor and 64% of the aluminumoxide contained in solution is extracted.

The filtered stirring liquor is evaporated in a vacuum evaporator at 60° to 70° C. until its volume is again reduced to about 1 cubic meter. This evaporated liquor now contains 290 grams $Na_2O$ per cubic decimeter and besides 113 grams $Al_2O_3$. The evaporated liquor may again be used for extraction. However when such evaporated liquor is used only so much bauxite (373 kg.) is added that after completion of the extraction the aluminate liquor contains 318 grams $Al_2O_3$ per cubic decimeter, as well as 290 grams $Na_2O$ and 93 grams NaCl. The further treatment is effected in the above described manner. The concentration and dilutions are so chosen, that due to the content of NaCl, there is no danger of a premature separation of aluminum hydroxide in any phase or step of the process.

The yield of aluminum oxide from bauxite by this process amounts to 92% to 93%, depending on the amount of $SiO_2$, contained in the bauxite as well as on the small losses of NaOH due to the formation of insoluble sodium aluminum silicate which remains in the red mud.

*Example 2*

In extracting aluminum oxide from bauxite by an extraction liquor containing caustic soda and sodium bromide the liquor after extraction was found to contain 290 g. NaOH
450 g. NaBr
350 g. $Al_2O_3$ This corresponds to a molecular proportion of $Al_2O_3$ to $Na_2O$ to NaBr equal 1 to 1.06 to 1.2.

After dilution of the thick liquor to a content of 102 grams $Al_2O_3$ per cubic decimeter the same was stirred and filtered for about 48 hours during which time 85 grams $Al_2O_3$ corresponding to a yield of 83% was obtained.

What I claim is:

A process for obtaining alumina from aluminiferous materials comprising decomposing the aluminiferous material by a decomposing liquor containing alkali metal oxide and at least one alkali metal halide of the group composed of sodium chloride, sodium bromide, potassium chloride, potassium bromide, the ratio of the alkali metal halide and the alkali metal oxide being approximately 1:3; and producing thereby an aluminate liquor, the alkali metal oxide being present in said liquor in such proportions as to maintain a ratio of the same and the aluminum oxide of between approximately 1.5 to 1 and 1.1:1.

RUDOLF SCHOLDER.